(12) United States Patent
Bondalapati et al.

(10) Patent No.: US 10,572,484 B2
(45) Date of Patent: Feb. 25, 2020

(54) DUPLICATE REDUCTION OR ELIMINATION WITH HASH JOIN OPERATIONS

(71) Applicant: Oracle International Corporation, Redwood Shores, CA (US)

(72) Inventors: Srikanth Bondalapati, Redwood City, CA (US); Rafi Ahmed, Fremont, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 15/454,739

(22) Filed: Mar. 9, 2017

(65) Prior Publication Data
US 2018/0081946 A1 Mar. 22, 2018

Related U.S. Application Data

(63) Continuation-in-part of application No. 15/268,048, filed on Sep. 16, 2016, now abandoned.

(51) Int. Cl.
*G06F 16/00* (2019.01)
*G06F 16/2455* (2019.01)
*G06F 16/2453* (2019.01)

(52) U.S. Cl.
CPC .... *G06F 16/24556* (2019.01); *G06F 16/2456* (2019.01); *G06F 16/24544* (2019.01)

(58) Field of Classification Search
CPC ............. G06F 16/284; G06F 16/24535; G06F 16/24537; G06F 16/27; G06F 16/24542; G06F 16/289; G06F 16/24539; G06F 16/2456; G06F 16/29; G06F 16/244; G06F 16/24532; G06F 16/24545; G06F 16/951; G06F 16/113; G06F 16/217; G06F 16/2453; G06F 16/24544; G06F 16/2455; G06F 16/2471; G06F 12/0897; G06F 16/212; G06F 9/5016; G06F 9/546; G06F 16/215;

(Continued)

(56) References Cited

U.S. PATENT DOCUMENTS 7,177,855 B2 2/2007 Witkowski et al.
7,676,450 B2 3/2010 Ahmed et al.

(Continued)

OTHER PUBLICATIONS

Oracle Help Center Database, "Database SQL Tuning Guide" from Database Online Documentation Library, 12c Release 1 (12.1.0.2), 2016, 45 pages.

*Primary Examiner* — Yicun Wu
(74) *Attorney, Agent, or Firm* — Vista IP Law Group, LLP

(57) ABSTRACT

Attributes and semantics of duplicate insignificance that are inherent or inferred in a database language statement are detected. Also, a join operation that is inherent or inferred in the database language statement is detected and examined for join semantics. The join semantics specifies or refers to a driving table to be subjected to a hash join operation that may populate one or more hash buckets. The optimizer and the execution layers may use cost estimation or heuristics to assign the left and right table roles to the tables involved in the join. The hash join operation removes left table duplicates during population of the hash buckets, resulting in full or partial duplicate elimination that occurs during the hash join operation.

20 Claims, 4 Drawing Sheets

(58) Field of Classification Search
CPC ............. G06F 16/2315; G06F 16/2365; G06F 16/2393; G06F 16/24556; G06F 12/0802; G06F 16/137; G06F 16/152; G06F 16/211; G06F 16/2246; G06F 16/2255; G06F 16/2282; G06F 16/2372; G06F 16/24547; G06F 16/24552; G06F 16/24561; G06F 16/2477; G06F 16/278; G06F 16/28; G06F 16/288; G06F 16/9024; G06F 9/5044; G06F 9/5088; G06F 16/9535; G06F 2212/1044; G06F 2212/465; G06F 11/3414; G06F 11/3672; G06F 11/368; G06F 11/3684; G06F 11/3688; G06F 11/3692; G06F 16/148; G06F 16/1815; G06F 16/1827; G06F 16/221; G06F 16/2445; G06F 16/24528; G06F 16/24554; G06F 16/2462; G06F 16/2468; G06F 16/258; G06F 16/273; G06F 16/285; G06F 9/505; G06F 16/30; G06F 16/337; G06F 16/35; G06F 16/90339; G06F 16/955; G06F 16/9577; G06F 17/2258; G06F 17/27; G06F 17/271; G06F 17/278; G06F 17/2785; G06F 21/552; G06F 21/60; G06F 21/6227; G06F 21/6245; G06F 2221/2101; G06F 8/51; G06F 8/70; G06F 9/46; G06F 9/465; G06F 9/466; G06F 9/467; G06F 9/4881; G06F 9/5083; G06F 9/542

See application file for complete search history.

(56) References Cited

U.S. PATENT DOCUMENTS

| | | | |
|---|---|---|---|
| 7,730,055 B2 | 6/2010 | Bellamkonda et al. | |
| 7,761,403 B2 | 7/2010 | Witkowski et al. | |
| 8,041,731 B2 | 10/2011 | Bellamkonda et al. | |
| 8,521,723 B1 | 8/2013 | Ahmed | |
| 8,554,761 B1 | 10/2013 | Ahmed | |
| 2003/0167258 A1* | 9/2003 | Koo | G06F 16/24537 |
| 2012/0109981 A1* | 5/2012 | Graefe | G06F 16/24561 |
| | | | 707/752 |
| 2013/0013585 A1* | 1/2013 | Graefe | G06F 16/2456 |
| | | | 707/714 |
| 2013/0054567 A1* | 2/2013 | Graefe | G06F 16/24542 |
| | | | 707/714 |
| 2014/0032569 A1* | 1/2014 | Kim | G06F 16/951 |
| | | | 707/747 |
| 2015/0142775 A1* | 5/2015 | Kang | G06F 16/24544 |
| | | | 707/714 |
| 2015/0339349 A1 | 11/2015 | Ahmed et al. | |
| 2018/0075102 A1* | 3/2018 | Oppenheimer | G06F 16/2453 |

* cited by examiner

DUPLICATE REDUCTION OR ELIMINATION WITH HASH JOIN OPERATIONS

The present application is a continuation-in-part of, and claims the benefit of priority to co-pending U.S. patent application Ser. No. 15/268,048, filed Sep. 16, 2016, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to managing very large databases, and more particularly to techniques for performing duplicate reduction or elimination with hash join database operations.

BACKGROUND

Today's enterprises often deploy mission-critical databases that can comprise several hundred gigabytes, and often several terabytes of data. The support and maintenance requirements of such very large databases (VLDBs) can be challenging for the enterprise. With the continued proliferation of information sensing devices (e.g., mobile phones, online computers, RFID tags, sensors, etc.), increasingly larger volumes of data are collected for various business intelligence purposes. For example, the web browsing activities of online users are captured in various datasets (e.g., cookies, log files, etc.) for use by online advertisers in targeted advertising campaigns. Data from operational sources (e.g., point of sale systems, accounting systems, CRM systems, etc.) can also be combined with the data from online sources. In some cases, such VLDBs can be "append only" stores and can comprise fact tables with over a billion rows. In some cases, the foregoing VLDBs can comprise a large number of duplicate rows.

Still, the users (e.g., enterprise business analysts, etc.) of such VLDBs query the datasets with expectations of high performance, including fast query response times. Database providers strive to satisfy such user desires by continually improving database query capabilities and/or performance. For example, the JOIN clause and/or other join conditions in structured query language (SQL) queries to combine two tables (e.g., views, etc.) in a database can be expanded to implement various methods for determining join results. For example, nested loop joins, hash joins, sort merge joins, Cartesian joins, and/or other join methods can be selected by the database system based on expected performance results (e.g., latency, resource costs, etc.).

Further, join types such as inner joins, outer joins, semi-joins, and anti joins can be implemented based at least in part on detected join conditions. Various keywords (e.g., DISTINCT) can also be included in query blocks as directives to eliminate the duplicate rows from the join results. The semantics of a "duplicate" can vary, depending on the query. In some cases, the presence of duplicates in query results is semantically insignificant as compared with absence of duplicates in query results. In many cases, a query can be examined to determine if the query results returned will (or might) exhibit presence or absence of insignificant duplicates. The aforementioned query examination can be performed over any portions, statements, or blocks of a given query.

A duplicate insignificant query block is one where semantics of the corresponding results are unaffected by the presence or absence of duplicates in the query block results. For example, eliminating duplicates from the query results of a duplicate insignificant query block does not alter the semantics of the query block, but can, in some cases, improve its overall performance. For some duplicate insignificant query blocks (e.g., query blocks with the DISTINCT keyword), a full removal of duplicates can be performed. For other duplicate insignificant query blocks, no duplicates or merely only some duplicates might be removed. In either case, full or partial removal of duplicates can serve to improve the efficiency of the overall set of operations of the query (e.g., JOIN, DISTINCT, GROUP BY, etc.) and/or database operations that follow the query.

Attempted approaches might execute a duplicate insignificant query block by performing a join operation followed by a duplicate elimination operation. For example, an execution plan derived from a certain duplicate insignificant query block might perform a hash join operation followed by a DISTINCT operation performed in set of post processing steps. In most cases, post-processing (e.g., to process the DISTINCT operation) for duplicate elimination can be expensive. What is needed is a way to perform duplicate elimination operations (e.g., that observe the distinct semantics) while performing other database operations (e.g., joins), so as to eliminate or reduce the costs of post processing steps.

What is needed is a technique or techniques to improve over various considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for performing duplicate reduction or elimination with hash join database operations, which techniques advance the relevant technologies to address technological issues with some approaches. More specifically, the present disclosure provides detailed descriptions of techniques used in systems, methods, and in computer program products for performing duplicate reduction or elimination with hash join database operations. Certain embodiments are directed to technological solutions for applying hashing techniques to data structures associated with join (e.g., hash join) operations to facilitate duplicate reduction or elimination in a manner that is concurrent with the join operations.

The disclosure addresses advanced techniques that refine the art beyond the techniques discussed in the foregoing BACKGROUND section. More specifically, described herein are techniques that combine duplicate removal with hash join processing. Combining these two operations makes duplicate removal almost without any cost and it results in a reduced number of rows thereby making post-join operations (e.g., distinct, group-by, subsequent joins, etc.) more efficient. The techniques can be used with any of the following join types: inner, semi, and anti.

Under certain conditions (e.g., as described in conditions discernible from database language constructions in a query block), duplicate elimination or reduction can be performed with the hash join operation. Two conditions of relevance are: (1) that the query block is duplicate-insignificant, and (2) that the post-join references in a query block are on a subset, not necessarily proper, of join-key columns. These two conditions must be satisfied for distinct elimination to be performed with hash join.

Duplicate Insignificance

In the following types of query blocks, duplicates are considered insignificant, because either duplicates are removed later, or because the presence of duplicates do not alter the semantics of the query block. Types include (1) query blocks with the DISTINCT operator, (2) query blocks with aggregate functions such as AGR_FUNC (distinct), MIN( ), or MAX( ) with/without a GROUP-BY clause, (3) query blocks with no aggregate functions and a GROUP-BY clause, (4) branches of UNION, INTERSECT, and MINUS query blocks, (5) semi-joined and anti-joined views, (6) occurrences of ANY, ALL, [NOT] IN, and [NOT] EXISTS subqueries, and (7) occurrences when duplicate-insignificant attributes can be inherited recursively from the containing query block by views and by the branches of UNION ALL, INTERSECT, MINUS, and UNION query blocks.

Removal of duplicates is mandatory for a duplicate-insignificant query block, if it has the DISTINCT operator or it contains UNION, INTERSECT, and MINUS. For other types of duplicate-insignificant query blocks removal of duplicate is not mandatory; however, removal of duplicates in such cases makes post-join operations (e.g., group-by, subsequent joins, etc.) more efficient.

Post-Join References

Any reference to the columns of a table that take place after the join of the table has been performed is known as post-join reference. References to the table in subsequent joins, subquery correlations, and in SELECT, GROUP-BY, or HAVING clauses are all examples of post-join references.

Consider the join predicates between two tables T1 and T2: T1.x=T2.y and T1.a=T2.b. The second condition for combining hash join with duplicate removal requires that the post-join references must be on {T1.x, T1.a}, {T1.x}, or {T1.a}. Note the equivalent columns of T2 (e.g., T2.b or T2.y) can also be in post-join references. The following Example Q1, Example Q2, and Example Q3 are examples of duplicate-insignificant query blocks, where hash join and duplicate removal can be combined.

EXAMPLE Q1

SELECT DISTINCT T1.X
FROM T1, T2
WHERE T1.Z=5 and T1.X=T2.Y;

EXAMPLE Q2

SELECT SUM(DISTINCT T1.X), MIN(T1.Y)
FROM T1, T2
WHERE T1.Z=5 and T1.X=T2.X and T1.Y=T2.Y;

EXAMPLE Q3

SELECT T2.A, MAX(T1.Y)
FROM T1, T2
WHERE T1.X=T2.A and T1.Y=T2.B
GROUP BY T2.A, T1.Z;

The following Example Q4 is an example of a duplicate-insignificant query block, where duplicate removal cannot be combined with hash join, since it violates the condition of post-join references being limited to only a subset of the join keys.

EXAMPLE Q4

SELECT DISTINCT T1.X, T2.C, T1.D
FROM T1, T2
WHERE T1.Z=5 and T1.X=T2.Y and T1.A=T2.B;

Join Types

There are several relevant types of joins that are performed in relational database systems:

Inner Join. This is a symmetric join. In this join, a row is returned, only if the join key from one table matches the join key from the other table. Also, nulls do not match any value. Example Q5 shows an example of inner join.

EXAMPLE Q5

SELECT T1.Col1 T1C1, T1.Col2 T1C2, T2.Col2 T2C2
FROM T1, T2
WHERE T1.Col1=T2.Col1;

Semi Join. This is an asymmetric join. It produces results that contain all rows from the driving table for which there is a matching row from the other (driven) table. In T1 left semi join T2, a row from the left table T1 is returned only when it matches with any of the rows on the right table T2. Similarly, for T1 right semi join T2, a row from the right table T2 of the join is returned only when it matches with any of the rows on the left table T1. Here, nulls do not match any value.

In Example Q6, T1 is the driving table and T2 is the driven table. In semi join, all post-join references must be only to the driving table. This designation of tables as driving tables and driven tables comes from the semantics of the query and it remains unaffected whether a left or right semi join is performed, that is, whether the tables end up on the left or the right.

EXAMPLE Q6

SELECT T1.Col1 T1.C1
FROM T1, T2
WHERE T1.Col1 S=T2.col1;

Anti Join. Is an asymmetric join. A row from the driving table is returned only if it does not match with any row from the other table. Even here, nulls do not match any value. In T1 left anti join T2, a row from table T1 is returned only if it does not match with any row from table T2. Similarly, in T1 right anti join T2, a row from table T2 is returned only if it does not match with any row from table T1.

In Example Q7, T1 is the driving table and T2 is the driven table. In anti join, all post-join references must be only to the driving table. This designation of tables as driving tables and driven tables comes from the semantics of the query and it remains unaffected whether a left or right anti join is performed, that is, whether the tables end up on the left or the right.

EXAMPLE Q7

SELECT T1.Col1 T1C1, T1.Col2 T1C2
FROM T1, T2
WHERE T1.Col1 A=T2.Col1;

Inner Join as Semi Join. When a query block satisfies both the necessary conditions of relevance (as heretofore-described) for combining duplicate elimination with hash join, then an inner join can be processed as a semi-join. This becomes possible, since the additional duplicates produced by the inner join do not matter in a duplicate-insignificant query block where the post-join references are on a subset of the join keys. Therefore, the strategy outlined for semi join suffices for inner join. When inner join is evaluated as semi join, then either of the tables involved in the join can be designated as the driving table. All post-join references to the driven table are modified to refer to the driving table based on the column equivalence implied by equi-join predicates. Once this designation of the driving table and the driven table has been made by the optimizer, the designation remains unchanged.

Hash Join

Some hash joins are implemented as a two-phase partition hash join. Consider a join between table R and S on join predicate R.x=S.y. In a first phase, R is partitioned into M partitions $R_1$, $R_2$ ... $R_M$ and S into M partitions $S_1$, $S_2$ ... $S_M$. The rows for both tables R and S are partitioned using the same partition hash function, say, H1 on the join key. The property of each pair of corresponding partitions $R_i$ and $S_i$ is that rows of $R_i$ will join only with rows of $S_i$. This property is ensured by using the same hash function to partition both R and S. Each table R and S are partitioned separately and their partitions are written to disk. In a second phase, M iterations are needed. During iteration i, two corresponding partitions $R_i$ and $S_i$ are read from disk and joined. An in-memory hash table is built for storing the rows in partition $R_i$ using a different hash function, say, H2. Each row in partition $S_i$, is used to probe (i.e., search using H2) the in-memory hash table for $R_i$ for matching row(s); if matching rows are found, then they are joined.

Role Designation and Role Reversal Situations

In some relational database systems a query optimizer decides the join order of tables. For hash inner, semi-/anti-join between tables T1 and T2, where T1 is the driving table, if T1 is designated by the optimizer as the left table and T2 as the right table, then T1 is used for building in-memory hash table and T2 is used for probing (i.e., searching) the hash table. In this case, T1 is called the build side and T2 is called the probe side.

However, sometimes the optimizer may designate the right table as the build side and the left table as the probe side. When this happens, the left semi-/anti-join (e.g., T1 left semi-/anti-join T2) becomes the right semi-/anti-join (e.g., T2 right semi-/anti-join T1), and vice versa, for the join of the two tables.

Sometimes such an optimizer designation can be reversed at run time by the execution layer, which may choose the smaller of the two partitions as the build side. This is called role reversal. In the role designation, performed either by the optimizer or by the execution layer, the property of being the driving table and the driven table remains unchanged.

Hybrid Hash Join

A hybrid hash join method, discussed hereunder, is a variation of the two-phase partition hash join method outlined above. Consider a join between T1 and T2, where T1 is the left table and T2 the right table.

Hybrid Phase: At the first step, T1 is partitioned into M partitions using a hash function, say, H1 that is based on the hash values of the join key. Here M is the total number of partitions. Depending upon the available memory, a K subset (where the K subset is much smaller than the total of M partitions) of these partitions are kept in main memory and the rest of the (M−K) partitions are written to disk. An in-memory hash table is built using a different a hash function, say, H2 for each of the K partitions. Next, T2 is read from disk and partitioned using H1. If a row from T2 hashes to one of the in-memory K partitions, it is immediately joined with the row(s) in that T1 partition; otherwise, that T2 row is written to one of the (M−K) partitions on disk. This step is called the hybrid phase, because rows are either partitioned or processed.

Partition-wise Join Phase: At the second step, the (M−K) partitions belonging to T1 and T2, which reside on disk, are brought into memory, a pair of corresponding partitions at a time. Each pair of partitions is joined in a manner similar to the second phase of the general hash join method described above. This step of hybrid hash join is called the partition-wise join phase.

Sub-Partitioning. During the partition-wise join phase, if a partition is too big to fit in memory, then it is split into multiple sub-partitions. An in-memory hash table is built for a sub-partition and the corresponding partition is used to probe the hash table. This process is repeated until all the sub-partitions have been processed. This strategy forces multiple scans of the probe-side partition.

If K above is 0, then the hybrid hash join method is identical to the general hash join method. If K is equal to M, then the partition-wise join phase is skipped.

Combining Hash Join and Duplicate Elimination

The following paragraphs discuss an execution strategy to perform duplicate removal with hash anti-/semi-join in a query block that satisfies the aforementioned conditions. Duplicates need to be removed only from the driving table, since all post-join references are made to this table alone. Duplicates can be removed during in-memory hash table construction.

Consider the following three cases for T1 anti-/semi-join T2, where T1 is the driving table: (1) If a T1 partition is designated as the build side, then duplicates are removed while a hash table is being built for the T1 partition. The corresponding T2 partition is read from disk to probe the hash table. All matched rows in the hash table are marked. At the end, all the marked rows are returned for semi join; and all the unmarked rows are returned for anti join. (2) If a build table partition does not fit into memory during partition-wise join, then the partition is split into multiple sub-partitions such that each sub-partition fits into memory. In such a scenario, full duplicate removal cannot take place, since each sub-partition is processed separately. (3) If a T1 partition is designated as the probe side, then no duplicate removal takes place. In this case, all the unmatched rows are returned from the probe side for anti-join; and all matched rows are returned from the probe side for semi-join. (4) If every partition of the driving table is used as the build side without requiring sub-partitioning, then full duplicate removal can be performed; in this case, the distinct operation, if it exists, can be considered redundant.

Using the disclosed techniques, a query optimizer can be modified to do look-ahead of subsequent operations and incorporate the savings from row reduction into its cost model. Therefore, the optimizer may designate the driving table as the build side more frequently. Similarly, the execution layer may choose to do role reversal less frequently. This may result in full duplicate removal in most cases.

The strategies that are described above for hash semi-/anti-join can be extended to inner hash joins as well, since inner join is a simpler version of semi join.

The foregoing identifies cases where full duplicate removal cannot take place and proposes a technique to process the cases nevertheless, since even partial duplicate removal makes subsequent operations more efficient.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
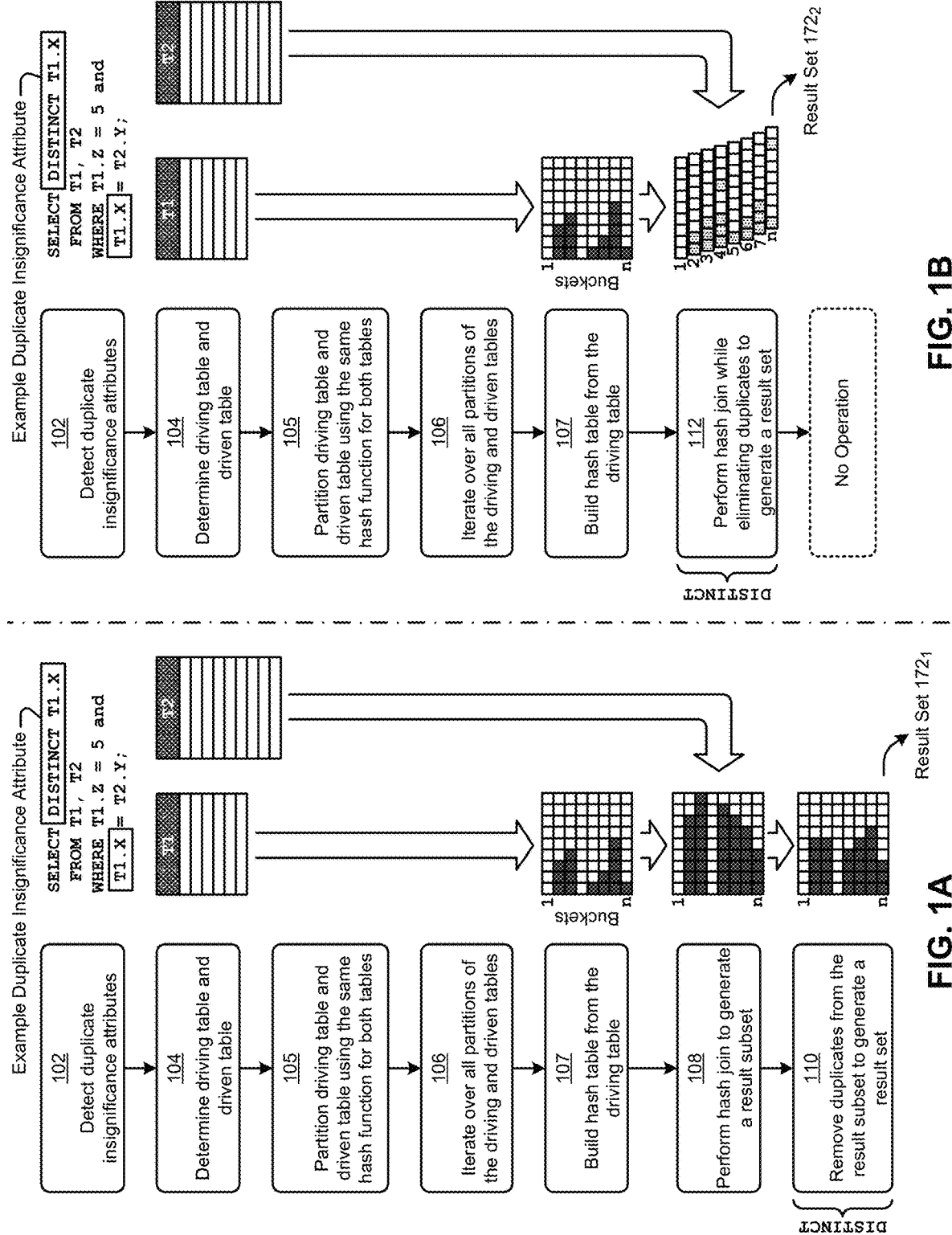
FIG. 1A illustrates a multi-step duplicate insignificant hash join technique.
FIG. 1B illustrates an efficient duplicate insignificant hash join technique as implemented in systems for performing duplicate reduction or elimination with hash join database operations, according to some embodiments.

Some embodiments of the present disclosure address the problem of performing join (e.g., hash join) operations on very large databases and some embodiments are directed to approaches for applying hashing techniques to data structures associated with join (e.g., hash join) operations to facilitate duplicate reduction or elimination concurrent with the join operations. The accompanying figures and discussions herein present example environments, systems, methods, and computer program products for performing duplicate reduction or elimination with hash join database operations.
Overview Disclosed herein are techniques that apply hash-related operations and duplicate elimination operations to data structures associated with hash join operations so as to facilitate duplicate reduction or elimination concurrent with the join operations. Specifically, in some embodiments, a hash join of two tables can be performed while fully or partially eliminating any duplicate rows precipitated by the hash join to generate a result set comprising all or some duplicate-free rows. In certain embodiments, the duplicate elimination while performing the hash join can be based at least in part on join conditions and/or duplicate insignificance attributes that are detected in various issued database statements. In other embodiments, portions (e.g., partitions, chunks, etc.) of the tables and/or structures (e.g., hash tables) derived from the portions of the tables might be allocated among various storage facilities such as a local main memory or a disk storage. Specifically, in some embodiments, local main memory might be used to store the hash tables and/or the probed partitions (e.g., with or without role reversal) so as to, for example, facilitate duplicate elimination operations. In certain embodiments, portions of the tables can be fetched from disk storage to local main memory for processing according to the herein disclosed techniques.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.
Definitions Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.
Descriptions of Example Embodiments Duplicate insignificance is an attribute that, when present, can be detected from a database language statement. One or more database language statements can comprise a query. A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database language statement and/or any data structure used for internal query representation.

A query may perform operations on data from source data object(s) on a row-by-row basis as the object(s) are loaded or, a query may perform operations on an entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (e.g., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by the modules called query optimizer and query execution.

A query optimizer can make determinations as to the presence or absence of duplicate insignificance and/or attributes thereto. More particularly, a query optimizer can detect the presence or absence of duplicate insignificance attributes that are associated with a query block by examining the internal data structure of that query block that refers to join operations subject to specific join conditions. Further a query optimizer can detect the presence or absence of duplicate insignificance attributes in statements that specify post join operations. In the illustrated example cases, joins are performed using variants of the well-known hash join technique.

FIG. 1A illustrates a multi-step duplicate insignificant hash join technique. As an option, one or more variations of multi-step duplicate insignificant hash join technique or any aspect thereof may be implemented in the context of the architecture and functionality of the embodiments described herein. The multi-step duplicate insignificant hash join technique or any aspect thereof may be implemented in any environment.

Specifically, FIG. 1A depicts a flow that can commence with detecting the duplicate insignificance attribute associated with a query block containing one or more joins pertaining to certain database statements (at step 102).

TABLE 1

Example of duplicate insignificant SQL query blocks

| Ref | SQL Query |
|---|---|
| QB1 | SELECT SUM(DISTINCT T1.X), MIN(T1.y) FROM T1, T2 WHERE T1.Z = 5 and T1.X = T2.Y; |
| QB2 | SELECT T1.X, MAX(T1.Y) FROM T1, T2 WHERE T1.X = T2.A and T1.Y = T2.B GROUP BY T1.X, T1.Z; |
| QB3 | SELECT T1.X |

TABLE 1-continued

Example of duplicate insignificant SQL query blocks

| Ref | SQL Query |
|---|---|
|  | FROM T1 WHERE T1.Z = 5 MINUS SELECT T2.Y FROM T2; |

The flow in FIG. 1A can determine the driving table and driven table pertaining to the join conditions in the databases statements (at step 104). For example, table T1 and the table T2 can be identified as the driving table and the driven table, respectively. Either driving or the driven table can become the left or the right table. The left table can sometimes be referred to as the "build" table. The right table can sometimes be referred to as the "probe" table. Both the driving table and the driven table are partitioned using the same hash function for both tables (at step 105), after which an iterator iterates (at step 106) over the partitions generated in step 105.

A hash table is built in memory from a partition of the driving table (at step 107). For example, a hashing algorithm can use certain inputs to apply a deterministic hash function to the table T1 (e.g., the driving table) to generate a hash value between 1 and n, where n is the size of the hash table. Specifically, for a hash join, the input values can be the join keys, with the hash table comprising an array of hash buckets. Each row in a corresponding partition of the driven table is used (e.g., in the iterations pertaining to step 106) to probe (i.e., search) the in-memory hash bucket of the driving table for matching row(s); if matching rows are found, then they are joined. The hash table can be used to perform the hash join of the driving and the driven tables to generate a result subset (at step 108).

In many cases, the result generated by the hash join can produce duplicate rows or there may be existing supplicates in the left table. However, the duplicate insignificance attribute (e.g., DISTINCT keyword, GROUP BY clause, etc.) from the shown query block indicates that the duplicate rows are not significant in the query block results. In such cases, the duplicate rows can be removed from the result subset to generate a result set (at step 110). For example, duplicates in the hash table might be removed to generate a result set $172_1$ (e.g., comprising a single table) that can be returned to the user that issued the database statements. Unfortunately, in VLDBs comprising large tables with many duplicates, the two-step join and duplicate removal approach (e.g., join step 108 and duplicate elimination step 110) can consume significant computing resources. Further, the user can experience a long latency before the result set $172_1$ is presented.

The foregoing problems attendant to performing join operations and removing duplicates can be addressed by the herein disclosed techniques as described as pertaining to FIG. 1B.

FIG. 1B illustrates an efficient duplicate insignificant hash join technique as implemented in systems for performing duplicate reduction or elimination with hash join database operations. As an option, one or more variations of efficient duplicate insignificant hash join technique or any aspect thereof may be implemented in the context of the architecture and functionality of the embodiments described herein. The efficient duplicate insignificant hash join technique or any aspect thereof may be implemented in any environment.

Specifically, according to the herein disclosed techniques, the efficient duplicate insignificant hash join technique can commence with detecting the duplicate insignificance attribute associated with a query block containing one or more join conditions pertaining to certain database statements (at step 102). The driving table and the driven table pertaining to the join conditions in the databases statements can further be determined (at step 104). For example, table T1 and the table T2 can be identified as the driving table and the driven table, respectively. The rows of table T1 are partitioned into a number of partitions and the rows table T2 are partitioned (at step 105) into the same number of partitions using the same partition hash function on the join key. The partitions belonging to both the tables are stored on disk. The shown flow begins iterations (at step 106) over all of the partitions of the driving and driven tables. A hash table comprising a set of in-memory buckets can be built from a partition of the driving table (at step 107). When facilitated by the herein disclosed techniques, the hash table can be used to perform a hash join of the driving table and the driven table while eliminating duplicates to generate a result set (at step 112). More specifically, while hash tables are being built, duplicate elimination is performed by not inserting a new entry (e.g., row) into the hash bucket with the same join key of a row already in the hash bucket. After the iterations initiated at step 106 have been completed, the result set $172_2$ can be delivered to the user without executing the DISTINCT operation (e.g., without executing a duplicate elimination step 110). Other operations and/or execution plan nodes might be identified as pass-through nodes when implementing the herein disclosed techniques.

Any or all of the foregoing example duplicate insignificant query blocks having duplicate insignificant attributes might be involved in any techniques for duplicate reduction or elimination with hash join operations. While the herein disclosed techniques can be implemented for any duplicate insignificant query blocks, full duplicate removal may not be achieved in all cases. In particular, in certain cases, some but not all duplicates are eliminated during hash join. For example, some query blocks have a DISTINCT keyword to indicate a full duplicate removal, however in some cases duplicates might be reduced but not eliminated, either because the driving table is selected as the right table or a role reversal takes place during join evaluation and given the fact that distinct elimination can take place only from the table on the driving side. In such cases, one or more operations that implement distinct semantics (e.g., as may be required by the DISTINCT key word), can be performed as a post join operation.

Figure 2:
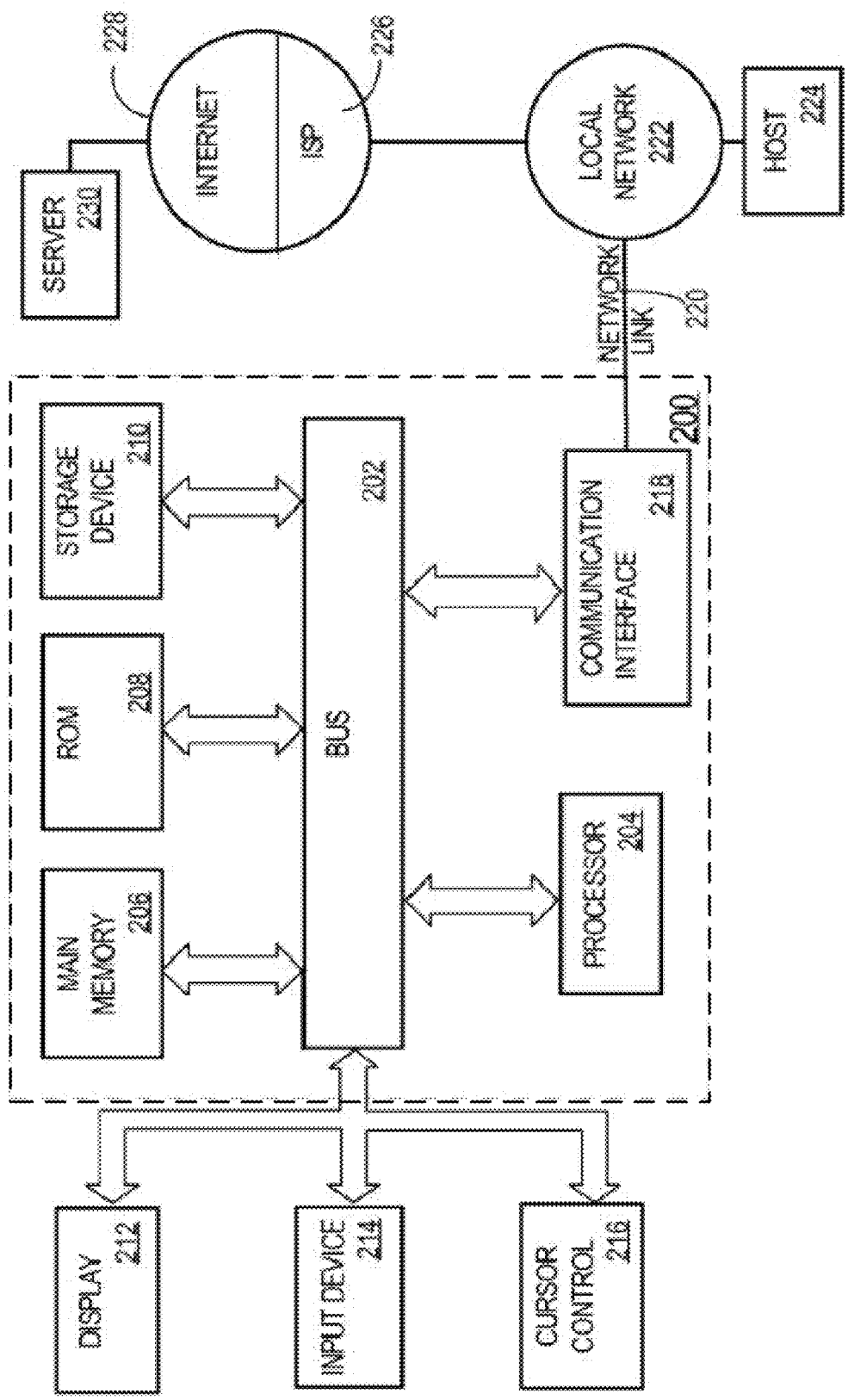
FIG. 2 illustrates a computer system upon which one or more embodiments may be implemented.

FIG. 2 illustrates a computer system upon which one or more embodiments may be implemented. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Figure 3:
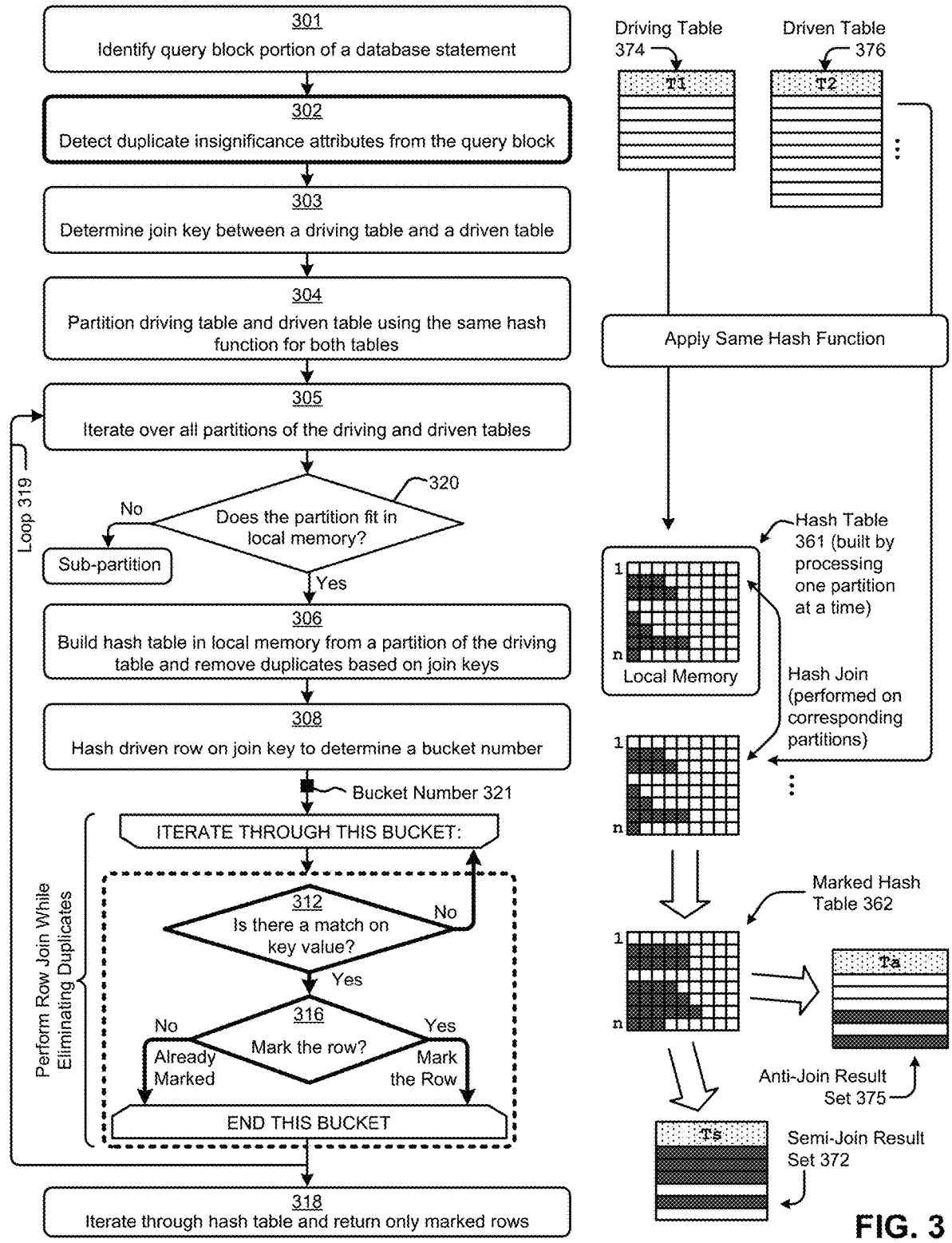
FIG. 3 depicts a hash join duplicate elimination technique as implemented in systems for performing duplicate reduction or elimination with hash join database operations, according to some embodiments.

FIG. 3 depicts a hash join duplicate elimination technique as implemented in systems for performing duplicate reduction or elimination with hash join database operations. As an option, one or more variations of hash join duplicate elimination technique or any aspect thereof may be implemented in the context of the architecture and functionality of the embodiments described herein. The hash join duplicate elimination technique or any aspect thereof may be implemented in any environment.

The hash join duplicate reduction or elimination technique presents one embodiment of certain steps and/or operations for performing a hash join while eliminating duplicates in a database environment according to the herein disclosed techniques. In one or more embodiments, the steps and underlying operations shown in the hash join duplicate elimination technique can be facilitated at least in part by a duplicate reduction or elimination join engine and/or other components of a database server implementing an instance of a computer system, such as is described in FIG. 2. As shown, the hash join duplicate elimination technique can commence by identifying a query block portion of a database statement (at step 301). The join conditions of the database statement can be examined (at step 302) to detect duplicate insignificance attributes (e.g., from one or more query block portions of the database statement) and to determine a join key between a driving table and a driven table (at step 303).

The driving table and the driven table associated with the join conditions can also be determined from the foregoing examination. As an example, for join conditions calling for joining a table T1 and a table T2, a planner in the database server might select the smaller table T1 as the driving table 374 (e.g., build table, left table, etc.) and identify the larger table T2 as the driven table 376 (e.g., probe table, right table, etc.). The tables (e.g., driving table 374 and driven table 376) are both partitioned using the same hash function for both tables (at step 304).

A loop is entered at step 305. A loop condition iterates over all partitions of the driving and driven tables to perform operations within the shown loop 319.

For each subject partition, decision 320 is taken to determine if the driving table can be stored in local memory ("Yes" path of the shown decision 320), and if so, a hash table can be built on the driving table and held in local memory (at step 306); otherwise partition the driving table using any known partitioning techniques.

When taking the "Yes" path of the decision 320, the hash table 361 might be built (at step 306) by hashing table T1 using the join key from the join conditions. When building the buckets of the hash table, duplication elimination semantics are applied such that no generated bucket of the hash table will contain any two rows having the same join key value.

The driven table can be probed against the hash table to perform a hash join while eliminating duplicates. Specifically, for each row in the driven table, a row-wise join while eliminating duplicates operation can be performed. In performing such a duplicate elimination operation, the value in the join key column of each row in the driven table can be hashed (at step 308) using the same hashing function that was used to build the hash table 361. Application of such a hashing function results in a bucket number 321. Rows in the particular bucket of hash table 361 that corresponds to the resulting bucket number are then iterated over for a match. If a match exists, the "Yes" path of decision 312 is taken and the row is marked ("Yes" branch of decision 316), unless it had already been marked ("No" branch of decision 316). If there was no match on the key value, ("No" path of decision 312) the processing moves to the next row in the current bucket iteration. The marked hash table 362 can be used to generate a result set to be returned to the user issuing the database statements (at step 318). The structure and/or content of the result set can be based at least in part on the join type indicated by the join conditions. For example, in the case of a semi-join, all the marked rows in the marked hash table 362 can be returned in a semi-join result set 372. As another example, in the case of an anti-join, all the unmarked rows from the marked hash table 362 can be returned in an anti-join result set 375. In some cases the unmarked rows can be immediately returned to the requestor on a row-by-row basis (e.g., without forming the anti-join result set).

Processing Left Semi-/Anti-Hash Join and Right Semi-/Anti-Hash Join

The heretofore-described techniques for left semi-/anti-hash join can be applied for right semi-/anti-hash join as well. The techniques described above for semi-/anti-hash join can be extended to inner/outer hash joins as well, since inner join is a simpler version of semi-join when both of the conditions of relevance (as heretofore-described) are satisfied, and since outer join is a combination of inner and anti-joins. For inner/left outer joins, the matched rows can be returned immediately along with removing the hash table entry. For left outer joins, either the leftover entries or the unmarked rows in the hash table are returned by nullifying the columns coming from the right table.

Additional Embodiments of the Disclosure

Additional Practical Application Examples

Figure 4:
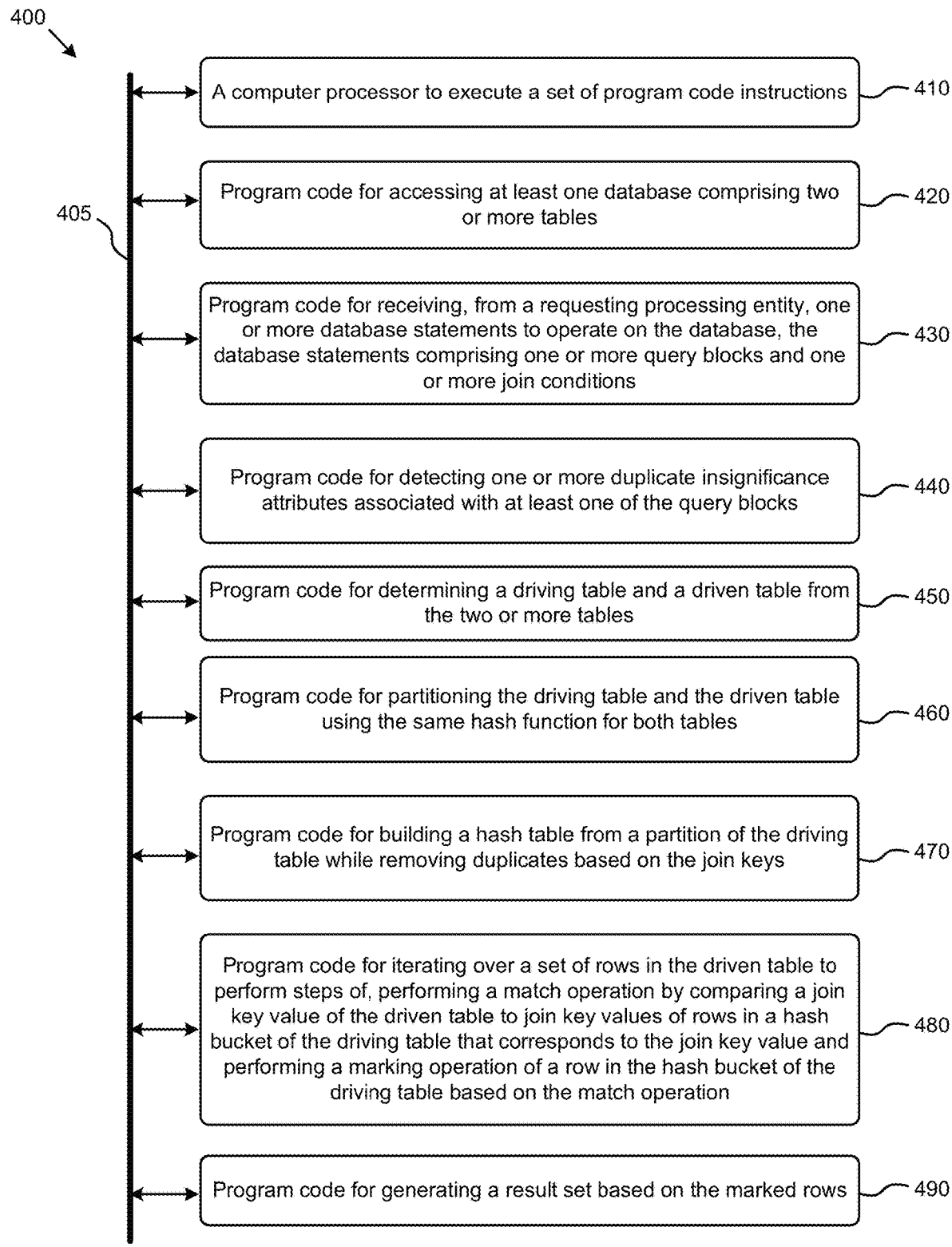
FIG. 4 depicts system components as arrangements of computing modules that are interconnected so as to implement certain of the herein-disclosed embodiments.

FIG. 4 depicts a system 400 as an arrangement of computing modules that are interconnected so as to operate cooperatively to implement certain of the herein-disclosed embodiments. The partitioning of system 400 is merely illustrative and other partitions are possible. As an option, the system 400 may be implemented in the context of the architecture and functionality of the embodiments described herein. Of course, however, the system 400 or any operation therein may be carried out in any desired environment. The system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims. The shown embodiment implements a portion of a computer system, presented as system 400, comprising a computer processor to execute a set of program code instructions (module 410) and modules for accessing memory to hold program code instructions to perform: accessing at least one database comprising two or more tables (module 420); receiving, from a requesting processing entity, one or more database statements to operate on the database, the database statements comprising one or more query blocks and one or more join conditions (module 430); detecting one or more duplicate insignificance attributes associated with at least one of the query blocks (module 440); determining a driving table and a driven table from the two or more tables (module 450); partitioning the driving table and the driven table using the same hash function for both tables (module 460); subjecting a partition of the driving table to a hash join operation that populates one or more hash buckets, wherein the hash join operation removes duplicates during population of the one or more hash buckets (module 470); iterating over a set of rows in the driven table to perform steps of, performing a match operation by comparing a join key value of the driven table to join key values of rows in a hash bucket of the driving table that corresponds to the join key value and performing a marking operation of a row in the hash bucket of the driving table based on the match operation (module 480); and generating a result set based on the marked rows (module 490).

Variations of the foregoing may include more or fewer of the shown modules and variations may perform more or fewer (or different) steps, and/or may use data elements in more, or in fewer or different operations.

Some embodiments include variations where skipping the marking operation is based at least in part on the duplicate insignificance attributes.

Some embodiments include variations that comprise steps for allocating at least a portion of the driving table or the driven table to at least one of, a local memory or a disk storage.

Some embodiments include variations where the result set is based at least in part on a join type derived from the join conditions.

Some embodiments include variations where the join type is at least one of, an inner join, an outer join, an anti-join, or a semi-join.

Some embodiments include variations that comprise steps for partitioning at least one of, the driving table (to generate one or more driving table partitions), or the driven table (to generate one or more driven table partitions).

Some embodiments include variations where at least a portion of at least one of the driven table partitions is used to build a hash table to facilitate the row-wise hash join.

Some embodiments include variations where at least one of the driving table partitions is used to probe a hash table to facilitate the row-wise hash join.

Some embodiments include variations where the partitioning comprises hashing the driving table or the driven table on a join key derived from the join conditions.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    accessing at least one database comprising two or more tables;
    receiving, from a requesting processing entity, one or more database statements to operate on the database, the one or more database statements comprising one or more query blocks that specify one or more join conditions and one or more post join operations;
    detecting that at least one query block of the one or more query blocks comprises one or more duplicate insignificant attributes;
    determining a driving table from the two or more tables, the driving table to be subjected to a hash join operation that populates one or more in-memory hash buckets, wherein the hash join operation removes duplicates during population of the one or more hash buckets; and determining a driven table from the one or more tables, the driven table is used in the hash join operation.

2. The method of claim 1, further comprising performing the hash join operation to form a result set comprising marked rows.

3. The method of claim 2, wherein the result set comprises an anti-join result set.

4. The method of claim 2, wherein the result set is based at least in part on a join type derived from the one or more join conditions.

5. The method of claim 4, wherein the join type is at least one of, an inner join, an outer join, an anti-join, or a semi-join.

6. The method of claim 1, wherein the one or more duplicate insignificant attributes are determined when the post join operations in the query blocks refer to a subset of join key columns of the driving table.

7. The method of claim 6, wherein the subset of join key columns are specified in at least one of, a SELECT clause.

8. The method of claim 1, wherein detection of the duplicate insignificant attributes is made if the query block comprises a DISTINCT operator, and a SELECT clause of the query block does not contain an aggregate function that is not duplicate-insignificant.

9. The method of claim 1, the duplicate insignificant attributes are detected:
   (a) when the query block comprises at least one of a distinct aggregate function, a MIN( ), MAX( ), SUM(DISTINCT), COUNT(DISTINCT), or AGGREGATE(DISTINCT) aggregate function with or without a GROUP-BY clause, or
   (b) when the query block does not comprise any aggregate function and comprises a GROUP-BY clause, or
   (c) when the query block is a UNION, INTERSECT, or MINUS query block, or
   (d) when the query block is a semi-joined view or anti-joined view that originates from subquery unnesting transformations, or,
   (e) when the query block comprises an ANY, ALL, [NOT] IN, or [NOT] EXISTS subquery.

10. A computer readable medium, embodied in a non-transitory computer readable medium, the non-transitory computer readable medium having stored thereon a sequence of instructions which, when stored in memory and executed by one or more processors causes the one or more processors to perform a set of acts the acts comprising:
   accessing at least one database comprising two or more tables;
   receiving, from a requesting processing entity, one or more database statements to operate on the database, the one or more database statements comprising one or more query blocks that specify one or more join conditions and one or more post join operations;
   detecting that at least one query block of the one or more query blocks comprises one or more duplicate insignificant attributes;
   determining a driving table from the two or more tables, the driving table to be subjected to a hash join operation that populates one or more in-memory hash buckets, wherein the hash join operation removes duplicates during population of the one or more hash buckets; and
   determining a driven table from the one or more tables, the driven table is used in the hash join operation.

11. The computer readable medium of claim 10, further comprising instructions which, when stored in memory and executed by the one or more processors causes the one or more processors to perform acts of performing the hash join operation to form a result set comprising marked rows.

12. The computer readable medium of claim 11, wherein the result set comprises an anti-join result set.

13. The computer readable medium of claim 11, wherein the result set is based at least in part on a join type derived from the one or more join conditions.

14. The computer readable medium of claim 13, wherein the join type is at least one of, an inner join, an outer join, an anti-join, or a semi-join.

15. The computer readable medium of claim 10, wherein the one or more duplicate insignificant attributes are determined when the post join operations in the query blocks refer to a subset of join key columns of the driving table.

16. The computer readable medium of claim 15, wherein the subset of join key columns are specified in at least one of, a SELECT clause.

17. The computer readable medium of claim 10, wherein detection of the duplicate insignificant attributes is made if the query block comprises a DISTINCT operator, and a SELECT clause of the query block does not contain an aggregate function that is not duplicate-insignificant.

18. The computer readable medium of claim 10, the duplicate insignificant attributes are detected:
   (a) when the query block comprises at least one of a distinct aggregate function, a MIN( ), MAX( ), SUM(DISTINCT), COUNT(DISTINCT), or AGGREGATE(DISTINCT) aggregate function with or without a GROUP-BY clause, or
   (b) when the query block does not comprise any aggregate function and comprises a GROUP-BY clause, or
   (c) when the query block is a UNION, INTERSECT, or MINUS query block, or
   (d) when the query block is a semi-joined view or anti-joined view that originates from subquery unnesting transformations, or,
   (e) when the query block comprises an ANY, ALL, [NOT] IN, or [NOT] EXISTS subquery.

19. A system comprising:
   a storage medium having stored thereon a sequence of instructions; and
   one or more processors that execute the instructions to cause the one or more processors to perform a set of acts, the acts comprising,
   accessing at least one database comprising two or more tables;
   receiving, from a requesting processing entity, one or more database statements to operate on the database, the one or more database statements comprising one or more query blocks that specify one or more join conditions and one or more post join operations;
   detecting that at least one query block of the one or more query blocks comprises one or more duplicate insignificant attributes;
   determining a driving table from the two or more tables, the driving table to be subjected to a hash join operation that populates one or more in-memory hash buckets, wherein the hash join operation removes duplicates during population of the one or more hash buckets; and
   determining a driven table from the one or more tables, the driven table is used in the hash join operation.

20. The system of claim 19, further comprising performing the hash join operation to form a result set comprising marked rows.

\* \* \* \* \*